W. KAISLING.
TELEPHONE KEY.
APPLICATION FILED MAR. 7, 1907. RENEWED OCT. 2, 1911.
1,176,759.
Patented Mar. 28, 1916.
2 SHEETS—SHEET 1.
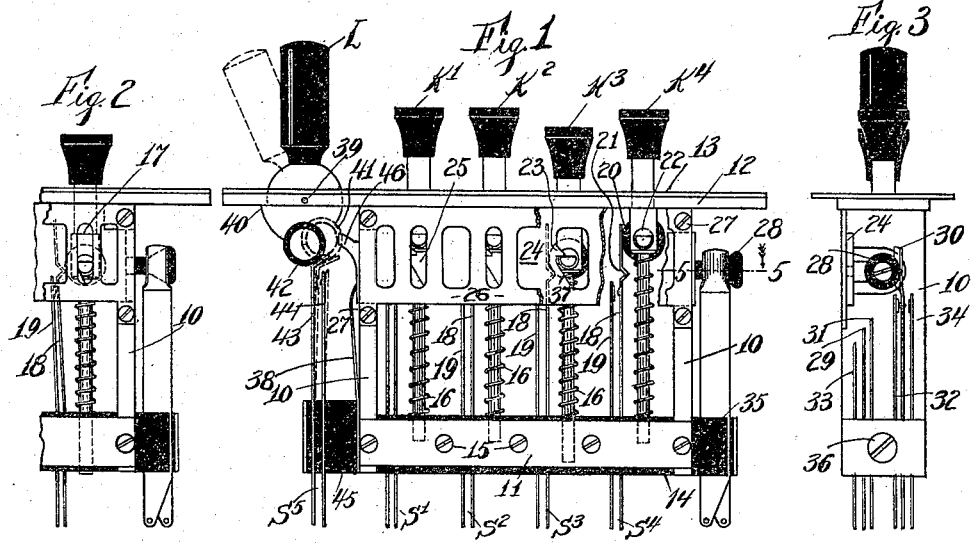
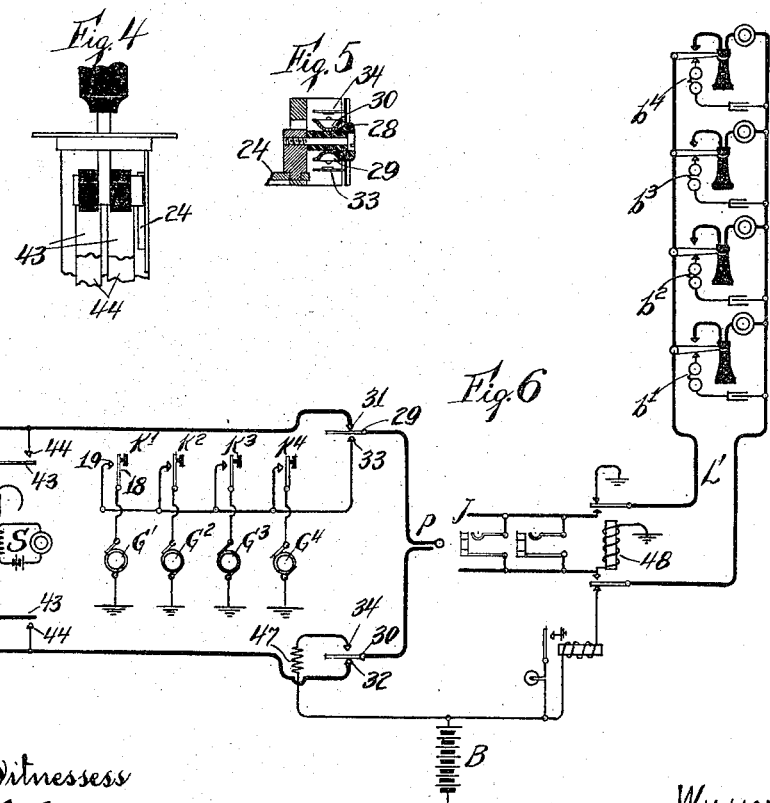
Witnesses
G. E. Mueller.
J. G. Kellogg
Inventor
WILLIAM KAISLING
by Thomas H. Ferguson
Attorney

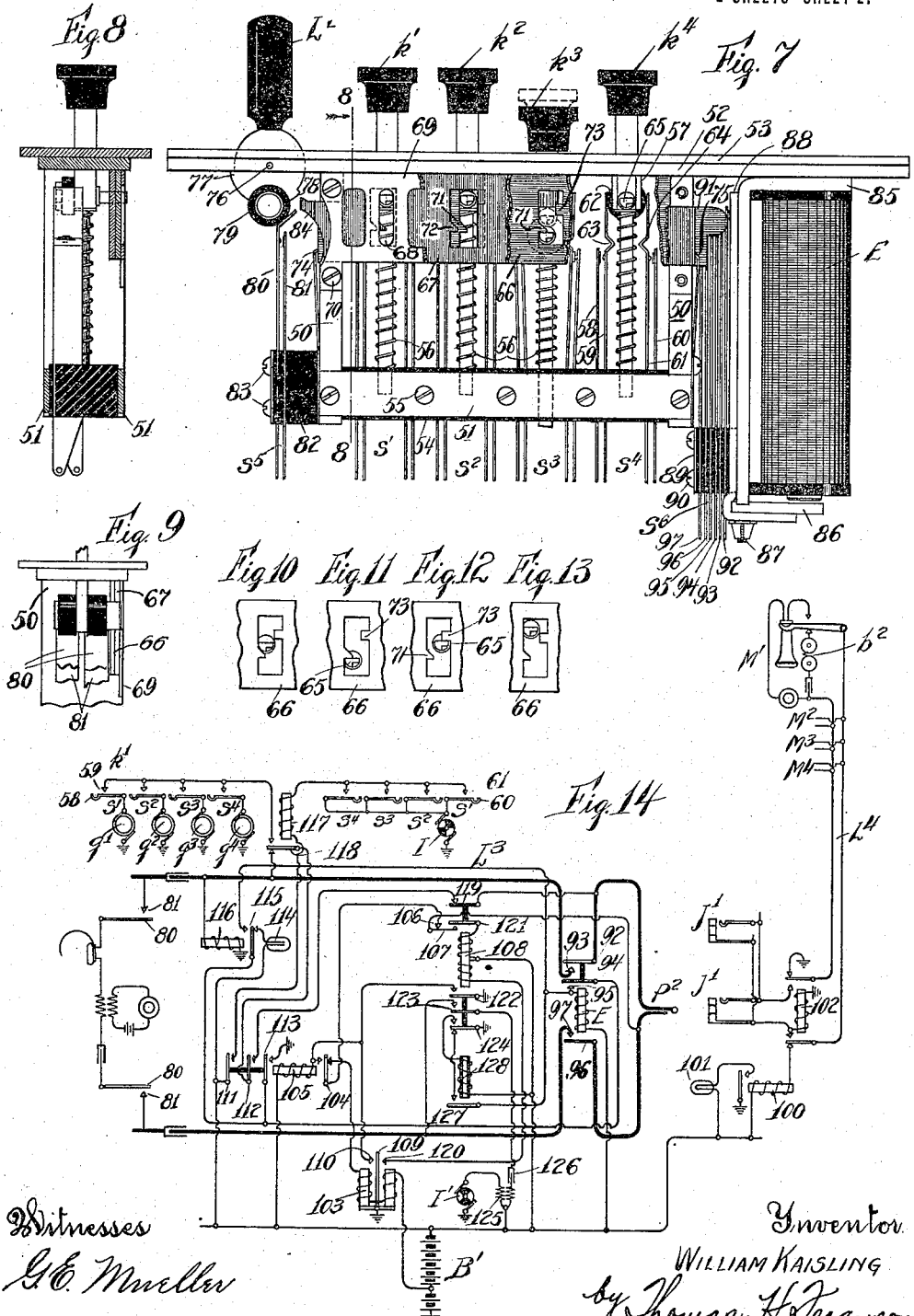

UNITED STATES PATENT OFFICE.

WILLIAM KAISLING, OF CHICAGO, ILLINOIS, ASSIGNOR, BY MESNE ASSIGNMENTS, TO KELLOGG SWITCHBOARD & SUPPLY COMPANY, A CORPORATION OF ILLINOIS.

TELEPHONE-KEY.

1,176,759.

Specification of Letters Patent.

Patented Mar. 28, 1916.

Application filed March 7, 1907, Serial No. 361,130. Renewed October 2, 1911. Serial No. 652,412.

*To all whom it may concern:*

Be it known that I, WILLIAM KAISLING, a citizen of the United States, and resident of Chicago, county of Cook, and State of Illinois, have invented certain new and useful Improvements in Telephone-Keys, of which the following is a specification.

The present invention relates to telephone keys such as are employed in operators' link-circuit connecting apparatus and has to do more particularly with that type known as "listening and ringing keys," by the use of which the operator can include her telephone set in circuit and apply ringing current to the line for signaling purposes, and especially for signaling one of a number of subscribers on the line.

The principal object of the invention is to provide a key of the character indicated, possessing certain novel features of construction together with a novel arrangement of parts which enable the key to be economically manufactured while leaving it compact and simple in construction and efficient in operation.

One of the features of the invention consists of a novel catch mechanism for maintaining the different actuating members of the key in their various operating positions.

Another feature consists in the employment of novel means for restoring the listening key to its normal position upon the operation of any one of the ringing keys.

The invention also includes other features and details which, together with the above, will be more fully understood upon reference to the following detailed description taken in connection with the accompanying drawing, and the scope of the invention will be particularly pointed out in the appended claims.

Referring to the said drawing, Figures 1 to 6 inclusive illustrate a combined ringing and listening key constituting one form of the invention, while Figs. 7 to 14 inclusive illustrate a similar key constituting a second form. Fig. 1 is a side elevation of the key constituting the first form; Fig. 2 is a similar elevation of a portion of the same, illustrating a ringing key in its fully depressed position; Fig. 3 is an end elevation of the same, viewed from the right; Fig. 4 is a fragmentary elevation of the same, viewed from the left; Fig. 5 is a detailed section taken on a plane indicated by the line 5—5 of Fig. 1; Fig. 6 is a diagram of circuits illustrating one use of said key; Fig. 7 is a side elevation of the key constituting the second form of the invention, parts being broken away for clearness; Fig. 8 is a vertical section taken on a plane indicated by the line 8—8 of Fig. 7; Fig. 9 is a fragmentary end elevation of the key, viewed from the left; Figs. 10, 11, 12 and 13 are views illustrating different operative positions of the catch-bar and an engaging pin of one of the ringing keys; and Fig. 14 is a diagram of circuits illustrating one application of said key.

Throughout these views, like characters refer to like parts.

In each form of the invention, the combined key construction includes a plurality of ringing keys of the plunger type in association with a listening key of the lever type, all mounted compactly upon an elongated frame. In each of these forms, each longitudinally movable key has three operating positions—a normal, a fully depressed, and an intermediate position, the fully depressed position being the ringing position, and the intermediate position an indicating position. In each form, longitudinally movable catch-bars coöperate with the ringing keys in retaining them in their various operating positions, and with the listening key to cause its restoration upon the operation of any of the ringing keys. In the form of the invention illustrated in Figs. 7 to 14 inclusive, armature mechanism of an electromagnet coöperates with the catch-bars in accordance with pre-determined circuit conditions, occasioned by specific acts performed while establishing a conversational circuit between subscribers.

Referring in detail to the drawing and at first to Figs. 1 to 6 inclusive, the various parts are mounted on a suitable supporting frame including the vertical members 10 united at their lower ends by plates 11 and at their upper ends by a strip 12 provided with a suitable face-plate 13. The strip 12 and face-plate 13 are provided with suitable openings through which the listening key lever L and each of a plurality of ringing keys K'—K²—K³—K⁴ extend. The keys K'—K²—K³—K⁴ extend downwardly into position to engage the upwardly extending sets of spring contacts S'—S²—S³—S⁴ respectively. The springs are secured at their lower ends by a suitable insulating member 14 preferably secured between the plates 11 by screws 15 and arranged so as to properly space the springs of each set in the manner illustrated. The insulating member 14 is provided with suitable guiding openings through which the lower ends of the keys K'—K²—K³—K⁴ are adapted to pass. The guiding ends of these keys are reduced in diameter and each is provided with a coiled returning spring 16 lying in close proximity to it and bearing at its opposite ends against the upper face of the insulating member 14 and a shoulder on the corresponding key. Each of the keys K'—K²—K³—K⁴ is adapted to occupy three operating positions, referred to as normal, indicating and ringing positions. In the normal position, a shoulder 17 on the shank of each key rests against the under face of the strip 12, and the spring contacts of the particular set remain out of engagement. As clearly illustrated, each set of contacts S'—S²—S³—S⁴ consists of an actuated contact 18 and a coöperating contact 19. Contact 18 is somewhat longer than contact 19 and its upper end bears against the insulating block 20 carried by the shank of the key. This shank is adapted to coöperate with an inclined portion 21 of the spring 18. The coöperating inclined face is preferably provided by giving the spring contact 18 an angular bend such as clearly shown in Fig. 1. As the key is moved downward, the insulating block 20 engages the inclined portion 21 and the contacts 18—19 are moved into engagement, as illustrated in Fig. 2. Each key is provided with a laterally projecting pin 22, having a horizontal upper face, adapted to coöperate with catch projections 23 formed in the walls of openings of a longitudinally movable catch-bar 24. The outer ends of the pins 22 extend through vertical guiding slots 25, formed in the guiding plate 26 which is fixed in position upon the frame, in the present instance by screws 27 threaded into the vertical frame members 10. In this form of the invention, only one longitudinally movable bar—namely, the bar 24—is employed. As clearly shown in Figs. 3 and 5, this bar is provided with an insulating button 28 having inclined faces which coöperate with the curved ends of the spring contacts 29—30 to force them apart, out of engagement with contacts 31—32 and into engagement with contacts 33—34, respectively. These spring contacts 29—30—31—32—33—34 are suitably mounted at their lower ends on an insulating block 35 located at one end of the supporting frame in line with the insulating member 14 and preferably secured by a screw 36 to the adjacent member 10 of the frame. By reason of the inclination of the coöperating faces of the spring contacts 29—30 and the insulating button 28, the bar 24 tends to occupy the position illustrated in Fig. 1, with the contacts 29—31 and 30—32 in engagement; and when free, will always return to this position. Normally, when a key is depressed, the under face of the pin 22 engages the upper inclined face of the catch 23, and the continued downward movement of the key forces the bar 24 to the left—as viewed in Fig. 1—thereby moving all the catches 23 out of their engaging positions and releasing any previously engaged key. As the pin 22 on the depressed key passes the catch 23, the latter springs back into engaging position and the key will be held thereby from returning to normal. This catch is located, however, so as to engage the pin 22 when the key is in an intermediate or indicating position. Further downward movement of the key will therefore bring the lower face of the pin 22 into engagement with an inclined face 37 of the bar 24 and thereby forcibly move the same far enough to actuate the spring contacts 29—30. When the depressed key has reached this position, its insulating block 20 will have engaged the inclined portion 21 of the contact 18, and the latter will have been forced into engagement with its associated spring contact 19. The key will remain in this fully depressed position only as long as force is applied to it. As soon as such force is removed, the key will tend to return to its normal position under the action of its returning spring 16, and the bar 24 will move to the right under the action of the spring contacts 29 and 30 upon the insulating button 28. This return movement is also assisted by a leaf-spring 38 which bears at its upper end against the left-hand end of the bar 24 and is firmly secured to the frame member 10 at its lower end. As a result of the removal of pressure from the depressed key, therefore, it will return until the upper face of the pin 22 engages the lower face of the catch 23. It will be held in this position until the catch-bar 24 is again reciprocated as a result of depressing another ringing key. By providing this indicating position, the operator can readily determine which key was last depressed, in case it is desired to again apply ringing current to the line, as will hereinafter more fully appear.

As previously indicated, the key structure includes the listening key lever L which extends through a suitable opening in the strip 12 and face-plate 13 and is pivoted at the point 39 to said face-plate. The lower circular portion of the lever L is provided with shoulders 40—41 which are adapted to engage the under side of the strip 12 to limit the movements of the lever. The lower end of the lever is provided with a projection having an insulated covering 42 which coöperates with a set of listening key contacts S⁵. This set includes two pairs of coöperating contacts 43—44. The contacts of each pair are normally out of engagement as illustrated in Fig. 1, but are adapted to be pressed into engagement by the movement of the lever L to the dotted line position of said figure. The set of spring contacts $S^5$ is suitably secured to an insulating block 45 secured to the adjacent frame member 10. The upper end of the contacts 43 are inclined and so positioned that upon the movement of the lever L to its dotted line position, it will be retained in such position by reason of the relative position of the pivot point 39 and the point at which the force of the springs is applied. By reason of this bias, a slight movement of the lever L from its dotted line position toward its normal position will free it and allow it to return to normal under the action of the springs 43. For the purpose of returning the lever L whenever one of the ringing keys $K'$—$K^2$—$K^3$—$K^4$ is depressed, the bar 24 is provided with a projection 46 which engages the lower portion of the lever L whenever said bar is actuated; and as a result, the lever L is moved far enough to allow it to return to normal under its bias.

In the diagram of Fig. 6, I have illustrated a portion of a link-circuit and a telephone line, having a plurality of substations, associated with it, with which the combined ringing and listening key, above described, may be employed. In the system of this diagram, selective ringing of the character described in Patent No. 779,533, granted Jan. 10, 1905, is employed. According to this arrangement, generators $G'$—$G^2$—$G^3$—$G^4$ are designed to give current of different frequencies, and the call-bells $b'$—$b^2$—$b^3$—$b^4$ at the substations are designed to respond only to current of the frequencies of the generators. In other words, the application of ringing current from generator $G'$ will be instrumental in actuating one of the call-bells only, as, for example, call-bell $b'$; current from generator $G^2$ will actuate the call-bell $b^2$, and so on. Assuming that the link-circuit of the diagram is connected with a calling line and that the operator has thrown her listening key lever L, so as to close each pair of contacts 43—44 and thereby include her telephone set S in circuit, and that it is learned that connection is desired with one of the substations on the line $L'$, say, for example, the substation having call-bell $b'$; then, after testing the line $L'$ in the usual manner, the operator will inform the calling party if the line is in use; and if not, she will insert the calling plug P into a jack J of the line $L'$ and depress the appropriate ringing key $K'$—$K^2$—$K^3$—$K^4$. Let it be assumed that the proper key to actuate the call-bell $b'$ is that designated $K'$. Upon depressing the key $K'$, the catch-bar 24 will be reciprocated and any key then in its indicating position will be released and allowed to return to normal. The depression of key $K'$ to its ringing position will throw contacts 29—30 to their alternate positions and at the same time close contacts 18—19 of the ringing key $K'$. Thereupon current will be supplied from the battery B through the resistance 47, contacts 34—30, plug and jack sleeve contacts, through the winding of cut-off relay 48 to ground, thereby actuating the cut-off relay and maintaining it actuated. At the same time, ringing current will be applied to the tip side of the circuit from the generator $G'$ over a path which may be traced from the live pole of the generator, through contacts 18—19 of key $K'$, contacts 33—29, plug and jack tip contacts, through the call-bells at the various substations, and back through the winding of the cut-off relay to ground. By reason of the frequency of the current supply, the call-bell $b'$ only will be actuated. As previously indicated, ringing current will be applied to the line only when the key $K'$ is fully depressed; and as soon as the operator removes her finger from the key, it will return to its intermediate or indicating position and thereafter, if it becomes necessary to again signal the party at the substation previously called, she may readily determine which key should be again depressed. In this instance, the removal of the plug P from its jack J at the end of conversation will not affect the position of the ringing key $K'$, but it will be restored only upon the subsequent depressing of another ringing key $K^2$, $K^3$ or $K^4$. In this connection, it should also be noted that upon the first full downward pressure of the ringing key $K'$, the listening key lever L was returned to its normal position.

Referring now to the form of the invention illustrated in Figs. 7 to 14 inclusive, it will be seen that the key parts are mounted on a similar rectangular supporting frame comprising vertical members 50 secured at their lower ends by plates 51 and connected at their upper ends to a strip 52 upon which the face-plate 53 is mounted. As before, the face-plate and the supporting strip are provided with suitable openings through which the listening key lever $L^2$ and the longitudinally movable ringing keys $k'$—$k^2$—$k^3$—$k^4$ extend. As before, these keys extend downward into positions to engage the upwardly projecting sets of contacts $s'$—$s^2$—$s^3$—$s^4$ which are firmly secured and spaced at their lower ends by the insulating member 54 located between the plates 51 and firmly secured thereto, preferably by screws 55. The insulating member 54 is provided with suitable guiding openings through which the lower ends of the keys $k'$—$k^2$—$k^3$—$k^4$ are adapted to pass. The guiding ends of these keys, as before, are reduced in diameter and each is provided with a suitable returning spring 56 closely coiled about it and bearing at its opposite ends against the member 54 and a shoulder of the corresponding key. Each of the keys is adapted to occupy three operating positions—namely, a normal, an intermediate or indicating, and a fully depressed or ringing position. In Fig. 7, keys $k'$—$k^2$—$k^4$ are shown in their normal positions, while $k^3$ is shown in its fully depressed position. In this figure, the dotted line position of the key $k^3$ shows said key in its intermediate or indicating position. In the normal position, a shoulder 57 on the shank of the key engages the under face of the frame strip 52, and the engaging ends of the contacts 58—59 and 60—61 of the particular set of spring contacts $s'$—$s^2$—$s^3$—$s^4$ are held out of engagement. The inner contacts of each of these pairs bear against the opposite sides of an insulating block 62 carried by the key and the contacts are bent at a point just above the upper ends of the contacts 58 and 60 so as to form angular portions 63—64, against which the block 62 is adapted to press upon the downward movement of the key to close the contacts 58—59 and 60—61. Each of the keys $k'$—$k^2$—$k^3$—$k^4$ is also provided with a lateral projecting pin 65 having its upper side and a portion of its lower side flattened so as to present horizontal engaging faces. These pins project through openings in the longitudinally movable catch-bars 66—67 and through guiding slots 68 in the fixed plate 69, which is preferably secured to the frame members 50 by the screws 70. As clearly shown in Fig. 7, each of the catch-bars 66—67 is provided with an angular catch for coöperation with the associated pin 65. These catches, which are designated, respectively, 71 and 72, are each provided with an upper inclined face and a lower horizontal face. The catches 71—72 are in horizontal alinement and so positioned with reference to the pin 65 as to engage the upper face of said pin when the key is in its ringing position. Bar 66 is also provided, on the opposite side of each opening from the catch 71, with a rectangular catch projection 73. The catch-bar 66 is pressed toward the right, as viewed in Fig. 7, by a leaf-spring 74 suitably secured at its lower end to one of the frame members 50 and bearing at its free end against the left-hand end of said bar. On the other hand, the catch-bar 67 is pressed toward the left by a similar leaf-spring 75 secured in like manner to the frame member 50 at the opposite end of the frame. As before, the key lever $L^2$ is pivoted at 76 to the frame strip 52, is limited in its movement by the shoulder stops 77—78, and is provided with a projection having an insulated covering 79 which is adapted to engage the upper inclined ends of the spring contacts 80. This set includes two pairs of contacts 80—81 which are secured and spaced at their lower ends by a suitable insulating block 82, preferably secured by screws 83 to the lower end of the adjacent frame member 50. As before, the movement of the listening key lever $L^2$ to the left forces the spring contacts 80 into engagement with their associated contacts 81, and the action of these spring contacts is such as to return the lever $L^2$ to its normal position until it has been moved to the left beyond a certain point. Then, as before, it is retained in its actuated position. As before, also, the listening key lever $L^2$ is adapted to be moved from its actuated position, so that it will be free to return under its bias, by a projection 84 on the catch-bar 67. At the opposite end of the key structure, is mounted an electromagnet E whose angular frame 85 has its short side secured to the under face of the strip 52, and its long side projecting downward parallel to the adjacent frame member 50. The electromagnet controls an armature 86 of the usual angular type, pivotally secured at its angle to the lower end of the frame 85 by a pivotal pin 87, and having its upwardly projecting end 88 arranged to operate a set of spring contacts $s^6$, supported and spaced at their lower ends by an insulating member 89, preferably secured by screws 90 to the lower end of the magnet frame 85. The upper end 88 of the armature 86 also coöperates with a projection 91 extending from the end of the catch plate 66 into close proximity thereto. As the armature is attracted, its upper end 88 engages the projection 91 and forces the catch-bar 66 longitudinally against the pressure of its spring 74. The set of contacts $s^6$ includes six coöperating contacts 92—93—94—95—96—97, which are designed to vary the electrical circuit connections in a manner hereinafter more fully described.

Having now described the structure of the key forming the second embodiment of the invention, its operation will be presented in connection with the diagram of Fig. 14 which illustrates the calling end of an operator's link-circuit $L^3$ in conjunction with a telephone line $L^4$ extending to a plurality of substations $M'$—$M^2$—$M^3$—$M^4$. This line is provided at the central office with the usual line relay 100, controlling the line signal 101, and the cut-off relay 102 by which the normal line limb connections to ground and battery are replaced by connections with the terminals of the jacks $J'$. Assuming that a calling party has initiated a call and obtained connection with the answering end of the link-circuit $L^3$, then the operator will throw over her listening key lever L² to close each pair of listening key contacts 80—81 to include her operator's set $s$ in circuit with the telephone of the calling party. Having learned that the substation wanted is located on the line L⁴, the operator will at once insert the calling plug P² into the jack J' of the line L⁴ and depress the appropriate ringing key $k'$, $k^2$, $k^3$ or $k^4$. As in the previous diagram, a harmonic system of selective signaling is employed. Of the contacts 58—59 and 60—61 of each set of ringing key contacts $s'$—$s^2$—$s^3$—$s^4$, the contacts 58 are severally connected to ground through the generators $g'$—$g^2$—$g^3$—$g^4$, and the contacts 60 are connected to ground through the common interrupter I. Assuming that the called-for party is at substation M' and that the call-bell $b^2$ at said substation is attuned to respond to the current from the generator $g'$, then the operator will depress ringing key $k'$ as soon as she has inserted the plug P² into the jack. The downward movement of the key $k'$ will cause the lower rounded portion of the pin 65 to engage the upper inclined faces of the catches 71—72 on the catch-bars 66—67 respectively, the catch 72 being also engaged since at this time the bar 67 lies in its engaging position as a result of the previous operation of the listening key lever L². The continued downward movement of the key will therefore force the catch-bars 66—67 to the left, as viewed in Fig. 7; and by the movement of catch-bar 67, move listening key lever L² far enough to allow it to return to normal under the bias produced by the spring contacts 80. Then, as soon as the pin 65 has moved far enough to allow the catch 71 to slip over its upper face, the catch-bar 66 will return slightly toward the right to the position illustrated in Fig. 11. This occurs when the key has reached its fully depressed position and the ringing spring contacts 58—59 and 60—61 have been moved into engagement. Now, if it be assumed that the line L⁴ is idle at this time, the insertion of the plug P² into the jack J' will cause a flow of current from the intermediate tap of the battery B' (which may, for example, supply current of the pressure of eight volts) through the polarized relay 103, normal contact 104 of sleeve supervisory relay 105, contacts 106—107 of relay 108, plug and jack sleeve contacts, and the winding of cut-off relay 102 to ground. The direction of this current flow through the polarized relay 103 is such as to move the armature contact 109 to the left into engagement with contact 110, thereby completing a circuit for the sleeve supervisory relay from the live pole of the battery B' (which may supply current at a pressure of, say, twenty-four volts) through the winding of relay 105 and contacts 110—109 to ground, thus energizing said relay to move its contact 104 to its alternate position and thereby interrupt the energizing circuit of the polarized relay 103 and complete a new path for current through the winding of supervisory relay 105, which may be traced from the live pole of the battery B', through said winding, alternate contact 104, closed contacts 106—107, plugs and jack sleeve contacts and cut-off relay 102 to ground. The energization of relay 105 also closes its contacts 111—112—113. By the closing of contact 113, a path for current is completed through the supervisory lamp 114, which extends from the live pole of the battery B', through said lamp, normal contact 115 of the tip supervisory relay 116, and closed contact 113 to ground. The closing of contact 111 completes a path for current from the live pole of the battery, through said closed contact, to and through the winding of the so-called "flip-flop" relay 117 to the contacts 61 of the ringing keys. The closing of contact 112 likewise completes a path from the contact 118 of the "flip-flop" relay 117, through closed contact 112, closed contact 119 to the tip contact of the calling plug P². The full downward movement of the key $k'$ for the purpose of supplying ringing current to actuate the call-bell $b^2$ at substation M' will therefore, when the parts have reached this point in their operation, close the ringing key contacts 58—59 and 60—61 of set $s'$ and immediately a flow of current will result through the "flip-flop" relay 117; and as the interrupter I rotates, the relay will be successively energized and deënergized to move its contact 118. When this contact is in its alternate position, current will be supplied from the generator G', through the contacts 58—59 of key $k'$, alternate contact 118, closed contact 112, closed contact 119, plug and jack tip contacts, thence to the tip limb of the line, through the substation, back over the sleeve limb and through the winding of the cut-off relay to ground. By reason of the action of the relay 117, this ringing current is intermitttently applied and this intermittent application is continued until the called-for party responds. As soon as he does this by removing his receiver from its hook, a path for battery current is completed through the sleeve supervisory relay 105 to the winding of the cut-off relay 102 as before, thence by one path through said winding to ground; and by another, over the sleeve limb of the line through the substation, back over the tip limb of the line, through the plug and jack tip contacts, closed contact 119, closed contact 112 and normal contact 118, as soon as it assumes this position in its to-and-fro movement, and the winding of tip supervisory relay 116 to ground. The closing of this circuit will energize supervisory relay 116 and, by moving its contact 115 to its alternate position, interrupt the circuit through the supervisory lamp 114 to cause its extinguishment and close a circuit through electromagnet E, which controls the spring contacts of set $s^6$ and the catch-bar 66. This circuit is completed from the live pole of the battery B', through the winding of said electromagnet, alternate contact 115 of tip supervisory relay 116, and closed contact 113 of sleeve supervisory relay 105 to ground. Prior to the energization of electromagnet E, the pin 65 on the key $k'$, and the associated projections in the catch-bar 66, occupy the position illustrated in Fig. 11. As soon as the electromagnet E is energized, its armature is attracted and catch-bar 66 is moved to the left, as viewed in Fig. 7, against the tension of its spring 74 and held in that position by the continued energization of the magnet. This movement of the catch-bar 66 frees the pin 65 of the key $k'$ and allows it to return, under the action of its returning spring 56, toward its normal position. Its complete restoration to normal, however, is not accomplished because this movement of the catch-bar has brought the catch 73 into the path of movement of the pin 65, and the latter therefore moves upward only until it engages said catch. The relative position of the parts is such that, when thus engaged, the key $k'$ is held in its intermediate or indicating position. If then, at any time before the connection is taken down, it becomes necessary to again signal the party at substation M', the operator can readily see that key $k'$ was the last depressed, since no other keys will occupy this intermediate position at this time. The movement of the armature 86 of the electromagnet E completes the talking circuit through the link-circuit strands by bringing the contacts 92—93 and 96—97 of set $s^6$ into engagement; and will also cause contacts 94—95 to engage and thereby provide a new path for current through the electromagnet E by way of said contacts and closed contact 113 of supervisory relay 105 to ground. At the end of conversation, the parties restore their receivers to their hooks and thereby produce the customary disconnect signal. As soon as the operator removes the plug P² from the jack J', the previous circuit through the sleeve supervisory relay 105 and the cut-off relay 102 will be interrupted with a consequent interruption of the circuit through electromagnet E at contact 113 of said supervisory relay. As soon as this magnet is deënergized, its armature 86 and the catch-bar 66 will be restored by the pressure of the spring 74. The return of the catch-bar toward the right will free the pin 65 from the catch 73 and allow the same to return to normal position, as illustrated in Fig. 13. In the operation of the key mechanism, only one key $k'$, $k^2$, $k^3$ or $k^4$ will be depressed at one time. Thus if key $k^2$ is depressed while key $k'$ is in its fully depressed position, the catch-bar 66 will be moved toward the left by the engagement of the pin 65 of the key $k^2$ with the inclined face of its associated catch 71; and consequently the catch 71, engaging the pin 65 of the depressed key $k'$, will be disengaged and the latter will return to its normal position. Again, if key $k^2$ be depressed while key $k'$ is in its intermediate position, the lower horizontal face, shown at the right of the pin 65, will bear against the upper horizontal face of the catch 73 and further downward movement will be prevented. Because the engaging faces lie at right angles to the direction of movement of the key, there will be no tendency to move the catch-bar 66 in a lateral direction and consequently the key $k^2$ will not be moved to an operative position and the previously depressed key $k'$ will not be disturbed.

Assuming that the line, into the jack of which the plug P² has been inserted, is busy, then there will exist at the sleeve contacts of the jacks a potential resulting from the connection of the sleeve contacts of one of said jacks with the live pole of the battery B', as is usual, either by way of the calling or answering plug of another link-circuit. This potential will be sufficiently above that of the intermediate tap of the battery B' so that, upon the insertion of the plug, current will flow from the sleeve contact of the jack, through the sleeve contact of the plug, closed contact 107—106, normal contact 104 of supervisory relay 105, and polarized relay 103 to the intermediate tap of the battery B'. This current flow will be of such a direction as to cause the armature contact 109 of the polarized relay to move to the right into engagement with its contact 120, thereby completing a circuit from the live pole of the battery B', through the lower winding of relay 108 and closed contacts 120—109 to ground. The closing of this circuit will energize relay 108 to cause it to open its normally closed contact 119 and to close contacts 107—121, followed by the opening of contacts 106—107 and the closing of contacts 122—123, and to move contact 124 from its normal to its alternate position. The opening of contacts 106—107 interrupts the path for current through the polarized relay 103; but since this interruption occurs after the closing of contacts 107—121, the relay is maintained in its actuated position by reason of the flow of current through its upper winding, closed contact 121—107, plug and jack sleeve contacts, and the winding of cut-off relay 102 to ground. The opening of contact 119 interrupts a possible circuit for ringing current. The closing of contact 130

122 completes a circuit through the winding of supervisory relay 105. The closing of contact 123 completes a circuit by which a characteristic signal is transmitted from the interrupter I' over the line of the calling party, as an indication to him that the called-for line is busy. This circuit is of the usual character and includes a primary circuit extending from the live pole of the battery B', through the primary winding of the induction coil 125 in the interrupter I' to ground; and a secondary circuit extending through the secondary winding of the induction coil 125, condenser 126 and closed contact 123 to the sleeve side of the circuit, the connection to the tip side of the circuit being through any of the grounds existing thereon. The depression of the ringing key k' will in this case not result in the application of ringing current to the line because of the interruption of the ringing circuit at contact 119. The operator will be apprised of the busy condition of the line by the display of the usual disconnect signal. Since the depression of the ringing key k' results in its being locked in its fully depressed position by the catch-bar 66, it will be necessary to actuate said bar before said key can be returned to its normal position. This is preferably done by momentarily energizing the electromagnet E through the agency of the contact 127 of the slow release relay 128 in conjunction with contact 124 of relay 108. Upon the initial energization of relay 108, a circuit is completed through the slow release relay 128 by way of alternate contact 124. This results in the closing of contact 127; but, because the contact 124 occupies its alternate position at this time, no circuit is completed for electromagnet E. However, as soon as the connection is taken down, relay 108 is again deënergized and its contact 124 returns to its normal position before contact 127 opens. Consequently a momentary circuit for the electromagnet E is completed through closed contact 127 and normal contact 124. The resulting momentary energization of electromagnet E causes the attraction of its armature with a resulting to-and-fro movement of the catch-bar 66. This movement is sufficient to release the pin 65 of the depressed key and allow the same to return to normal position.

It should be understood that the specific key construction may be modified somewhat without departing from the spirit and scope of my invention and that, in the control of the catch mechanism, the electromagnet E in the second form of the invention might be variously included in circuit.

What I claim as new and desire to secure by Letters Patent of the United States is:—

1. A telephone key comprising two sets of contacts, an actuating member for one of said sets biased to return to normal until moved beyond a definite point, an actuating member for said other set of contacts, means actuated upon the operation of said latter member to return said former member beyond said definite point to allow it to return to normal under its bias, and electromagnetically controlled means for subsequently restoring said latter member to an indicating position.

2. A telephone key comprising two sets of contacts, a returning spring, an actuating member for one of said sets of contacts acting against the tension of said spring until a definite point in its movement is reached, an actuating member for said other set of contacts, means actuated upon the operation of said latter member to return said former member beyond said definite point to allow it to return to normal under the action of said spring, and electromagnetically controlled means for subsequently restoring said latter member to an indicating position.

3. A telephone key comprising two sets of contacts, a returning leaf-spring, an actuating lever for one of said sets of contacts bearing against said spring and acting against its tension until a definite point in the movement of the lever is reached, an actuating member for said other set of contacts, means actuated upon the operation of said member to return said lever beyond said definite point to allow it to return to normal under the action of said spring, and electromagnetically controlled means for subsequently restoring said member to indicating position.

4. A telephone key comprising two sets of contacts, an actuating member for one of said sets biased to return to normal until moved beyond a definite point, an actuating member for said other set of contacts, a member moved during the operation of said latter actuating member against said former actuating member to return said former actuating member beyond said definite point to allow it to return to normal under its bias, and electromagnetically controlled means for subsequently restoring said latter member to an indicating position.

5. A telephone key comprising two sets of contacts, a returning spring, an actuating lever for one of said sets of contacts bearing against said spring and acting against its tension until a definite point in the movement of the lever is reached, an actuating member for said other set of contacts, a member moved during the operation of said actuating member against said lever to return it beyond said definite point to allow it to return to normal under the action of said spring, and electromagnetically controlled means for subsequently restoring said actuating member to an indicating position.

6. A telephone key comprising two sets of contacts, a returning spring, an actuating lever for one of said sets of contacts bearing against said spring and acting against its tension until a definite point in the movement of the lever is reached, a longitudinally movable spring-retracted key for actuating said other set of contacts, a member moved by the depression of said key against said lever to return it beyond said definite point to allow it to return to normal under the action of said spring, and electromagnetically controlled means for subsequently restoring said key to indicating position.

7. A telephone key comprising two sets of contacts, a returning spring, an actuating lever for one of said sets of contacts bearing against said spring and acting against its tension until a definite point in its movement is reached, a longitudinally movable spring-retracted key for actuating said other sets of contacts, a sliding member driven by the depression of said key against said lever to return it beyond said definite point to allow it to return to normal under the action of said spring, and electromagnetically controlled means for subsequently restoring said key to indicating position.

8. A telephone key comprising a frame having a face-plate and a supporting-bar substantially parallel thereto, two sets of spring contacts secured to said bar and extending toward said face-plate, a key-lever projecting through said face-plate and having its lower end acting against the tension of one of the spring contacts of the coöperating set until a definite point in its movement is reached, a longitudinally movable key projecting through said face-plate into proximity to the other set of spring contacts for actuating the same when depressed, a sliding catch-bar lying adjacent to said face-plate and provided with an opening having a catch projection, and a pin projecting laterally from said key through said opening into operative relation with said catch projection whereby the depression of said key forces said member against the lower end of said key-lever to return it beyond said definite point to allow it to return to normal under the action of said spring.

9. A party line telephone ringing key comprising a frame having a face-plate and a supporting bar extending substantially parallel thereto, a series of sets of spring contacts carried by said bar and extending toward said face-plate, a series of longitudinally movable keys extending through said plate into operative relation to said sets of contacts, a longitudinally movable catch-bar extending lengthwise of said plate and provided with a plurality of openings having catch projections, pins projecting laterally from said keys through said openings into operative relation with said catch projections, means operated by the depression of any of said keys to move said catch-bar to carry the catch projections thereon out of engagement with any of said pins, and springs for returning said keys to normal position.

10. A party line telephone ringing key comprising a frame having a face-plate and a supporting-bar extending substantially parallel thereto, a series of sets of spring contacts carried by said bar and extending toward said face-plate, a series of longitudinally movable keys extending through said plate into operative relation to said sets of contacts, a longitudinally movable catch-bar extending lengthwise of said plate and provided with a plurality of openings having catch projections, pins projecting laterally from said keys through said openings into operative relation with said catch projections, a bar parallel to said catch-bar and having slots through which said pins pass and by which they are guided, means operated by the depression of any of said keys to move said catch bar to carry the catch projections thereon out of engagement with any of said pins, and springs for returning said keys to normal position.

11. A party line telephone ringing key comprising a frame having a face-plate and a supporting-bar extending substantially parallel thereto, a series of sets of spring contacts carried by said bar and extending toward said face-plate, a series of longitudinally movable keys extending through said plate into operative relation to said sets of contacts, a longitudinally movable catch-bar extending lengthwise of said plate and provided with a plurality of openings having catch projections, pins projecting laterally from said keys through said openings into operative relation with said catch projections, serving when operated by the depression of any of said keys to move said catch-bar to carry the catch projections thereon out of engagement with any of said pins, springs for returning said keys to normal position, a set of spring contacts extending toward said face-plate from one end of said frame, a key-lever for actuating said contacts, and means operated upon the movement of said catch-bar to return said key lever to its normal position.

12. A party line telephone ringing key comprising a frame having a face-plate and a supporting-bar extending substantially parallel thereto, a series of sets of spring contacts carried by said bar and extending toward said face-plate, a series of longitudinally movable keys extending through said plate into operative relation to said sets of contacts, pins projecting laterally from said keys, a longitudinally movable catch-bar extending lengthwise of said plate and provided with slotted openings wider than said pins, staggered projections extending from opposite walls of said openings and shouldered so as to engage said pins, a spring for yieldingly pressing said catch-bar against said pins, inclined faces on the walls of said openings against which said pins are adapted to press, upon the depression of the keys, to move said catch-bar against the tension of said spring, and springs for returning said keys to normal position.

13. A telephone key comprising a set of spring contacts, a reciprocating actuating key therefor, a sliding catch-bar movable transversely of said key, a plurality of catch projections on said bar, a coöperating projection on said key, and electromagnetic means independent of said key for positively actuating said catch-bar.

14. A telephone key comprising a set of spring contacts, a reciprocating actuating key therefor, a sliding catch-bar movable transversely of said key and provided with a slot extending lengthwise of said key, catch projections extending from the walls of said opening, a pin projecting from said key through said slot into operative relation to said catch projections, and means independent of said key for actuating said catch-bar.

15. A telephone key comprising two sets of contacts, a lever for operating one of said sets of contacts, biased to return to normal when moved therefrom, means for holding said lever in actuated position, a longitudinally movable key for said other set of contacts operative, when depressed, to release said lever, and electromagnetically controlled means for subsequently restoring said key to an indicating position.

16. A telephone key comprising two sets of contacts, a lever for operating one of said sets of contacts, biased to return to normal when moved therefrom, a spring member for holding said lever in its fully operated position, a longitudinally movable key for operating said other set of contacts, means actuated by the operation of said key to release said lever, and electromagnetically controlled means for subsequently restoring said key to an indicating position.

17. A telephone key comprising two sets of contacts, a lever for operating one of said sets of contacts, holding means effective when said lever is in its extreme operative position, a key for actuating said other set of contacts, mechanism actuated by the operation of said key to engage said lever and move the same beyond the holding position whereby said lever returns to normal, and electromagnetically controlled means for subsequently restoring said key to an indicating position.

18. The combination with a listening key, of means for holding said key in its operated position, a plurality of ringing keys mounted adjacent to said listening key, a reciprocating member common to said ringing keys, means effective, on the actuation of any ringing key, to move said member to restore said listening key to normal, and electromagnetically controlled means for subsequently restoring said actuated ringing key to an indicating position.

19. The combination with a listening key, of means for holding said key in its actuated position, a plurality of ringing keys individual to said listening key, means whereby the actuation of any ringing key restores said listening key to normal, and electromagnetically controlled means for subsequently restoring said actuated ringing key to an indicating position.

20. A telephone key comprising two sets of contacts, an actuating member for operating one of said sets of contacts, biased to return to normal when moved therefrom, means for holding said member in actuated position, an actuating member for operating the other set of contacts, and a pair of sliding bars, one operative to free said first actuated member in response to the operation of the second actuating member, and the other operative to hold said second member in different positions.

21. A telephone key comprising two sets of contacts, an actuating member for operating one of said sets of contacts, biased to return to normal when moved therefrom, means for holding said member in actuated position, an actuating member for operating the other set of contacts, a pair of sliding bars, one operative to free said first actuated member in response to the operation of the second actuating member, and the other operative to hold said second member in different positions, and electromagnetically controlled means for operating said second bar.

22. In a selective ringing key, the combination with a plurality of plungers and associated sets of contact springs adapted to be individually actuated thereby, of transversely extending detents respectively provided upon said plungers, a universal slide-bar equipped with angularly disposed recesses and under-cut points associated with said detents, a light spring opposing the longitudinal movement of said bar, and a slotted member accommodating the detents to prevent rotation of the plunger and insure the actuation of the slide-bar, substantially as and for the purpose set forth.

23. The combination with a plurality of spring retracted plunger rods, each provided with a contact operating plunger, of contacts individual to each plunger and arranged to be operated thereby, a plate coöperating with said plunger for locking said plunger rods, a contact common to said plunger rods, and a second plate movable by said plungers to control said common contact.

24. A telephone key comprising a supporting frame, suitable contacts carried thereby, a spring returned actuating member for said contacts having three operating positions, means comprising an endwise slidable bar extending lengthwise of the frame for holding said member in its second and third positions when moved thereto, and means for operating said holding means.

25. A telephone key comprising a supporting frame, suitable contacts carried thereby, a spring returned actuating member for said contacts having three operating positions, means comprising an endwise slidable bar extending lengthwise of the frame for holding said member in its second and third positions when moved thereto, and electromagnetically actuated means for operating said holding means.

26. A telephone key comprising a supporting frame, suitable contacts carried thereby, a spring returned actuating member for said contacts having three operating positions, and an electromagnetically actuated endwise slidable bar extending lengthwise of the frame provided with catches for holding said member in its second and third positions when moved thereto.

27. A telephone key comprising a supporting frame, suitable contacts carried thereby, a spring returned actuating member for said contacts having three operating positions, a spring controlled endwise slidable catch member provided with a pair of catches for severally holding said member in two of said operating positions, and means for simultaneously disengaging one of said catches and moving the other into engaging position to thereby allow the movement of said member from one operating position to another.

28. A telephone key comprising a supporting frame, suitable contacts carried thereby, a spring returned actuating member for said contacts having three operating positions, a spring controlled endwise slidable catch member provided with a pair of catches for severally holding said member in two said operating positions, and electromagnetically actuated means for simultaneously disengaging one of said catches and moving the other into engaging position to thereby allow the movement of said member from one operating position to another.

29. A telephone ringing key comprising a supporting frame, suitable contacts carried thereby, a spring returned actuating member for said contacts having a ringing and two other operating positions, a spring returned endwise slidable bar for holding said actuating member in its ringing position when once moved thereto, and means for subsequently freeing said member and allowing it to assume another of its said operating positions.

30. A telephone ringing key comprising a supporting frame, suitable contacts carried thereby, a spring returned actuating member for said contacts having a ringing and two other operating positions, means including an endwise slidable catch bar for holding said actuating member in its ringing position when once moved thereto, and electromagnetically actuated means for subsequently freeing said member and allowing it to assume another of its said operating positions.

31. A telephone key comprising a supporting frame, suitable contacts carried thereby, a spring returned actuating member for said contacts having three operating positions, means including an endwise slidable catch bar for holding said member in its second and third position when moved thereto, means for operating said last means and an additional contact operated by said operating means.

32. A telephone key comprising a supporting frame, suitable contacts secured thereto, an actuating member for said contacts having a plurality of operating positions, an endwise slidable catch member for holding said actuating member in different operating positions, means for operating said catch member, and additional spring contacts actuated by said last means.

33. A party line telephone key comprising a supporting frame, sets of spring contacts carried thereby, actuating members for said sets of spring contacts each having a plurality of operating positions, an endwise slidable bar mechanism extending lengthwise of said frame operatively related to said actuated members for holding them in different positions, means for operating said bar mechanism, and additional spring contacts operated by said last means.

34. A telephone ringing key comprising a supporting frame, suitable contacts carried thereby, a spring returned actuating member for said contacts having a ringing and two other operating positions, an electromagnetically endwise slidable catch mechanism operative when in one position to hold said member in its ringing position and when in another position to hold said member in another of its operating positions.

In witness whereof, I hereunto subscribe my name this 5th day of March, 1906.

WILLIAM KAISLING.

Witnesses:
CAROLYN WEBER,
THOMAS H. FERGUSON.